United States Patent [19]

Kemlo et al.

[11] 4,037,761

[45] July 26, 1977

[54] INDICATION OF LEVELS IN RECEPTACLES

[75] Inventors: Kenneth Garry Kemlo, Lambton; Clive Allen Gregory, Armidale, both of Australia

[73] Assignee: The Broken Hill Proprietary Company Limited, Australia

[21] Appl. No.: 577,011

[22] Filed: May 13, 1975

[30] Foreign Application Priority Data

May 13, 1974 Australia ............... 7532/74

[51] Int. Cl.² ............................................. B22D 37/00
[52] U.S. Cl. .................... 222/590; 73/304 R; 164/4; 222/591; 340/244 C
[58] Field of Search ................ 340/244 C; 73/304 R; 164/1, 4, 156; 222/1, 56, 590, 591

[56] References Cited

U.S. PATENT DOCUMENTS

| 1,532,871 | 4/1925 | Bloch ........................... 340/244 C X |
| 3,012,373 | 12/1961 | Willis ................................ 164/156 X |
| 3,299,706 | 1/1967 | Bailey et al. ...................... 73/304 R |
| 3,370,466 | 2/1968 | Chang ............................. 73/304 R |
| 3,486,660 | 12/1969 | Heintz ............................ 222/64 X |
| 3,667,296 | 6/1972 | Schiefer et al. ..................... 164/4 X |

FOREIGN PATENT DOCUMENTS

1,264,812   3/1968   Germany ........................ 340/244 C

*Primary Examiner*—Stanley H. Tollberg
*Assistant Examiner*—David A. Scherbel
*Attorney, Agent, or Firm*—Cushman, Darby & Cushman

[57] ABSTRACT

This specification discloses a molten steel level determining device in which the electrode senses the interface between the molten steel and the slag on the molten steel at a predetermined level within the deeming ladle whereby the amount of steel remaining in the ladle may be more accurately determined than by prior art methods. With the aid of this information, the standard pour-down practice is modified to ensure that unrollable ingot butts are not poured. The level indicator may also be used to determine the level of other liquids in environments where known methods are not practicable.

11 Claims, 8 Drawing Figures

INDICATION OF LEVELS IN RECEPTACLES

This invention relates to a method of and apparatus for indicating a predetermined level of liquid or flowable material, hereinafter termed "liquid", in a receptacle from which the liquid is to be withdrawn. The invention has particular application for indicating a predetermined level in a ladle of molten steel from which the weight of the steel in the ladel can be determined although it has obvious application to other liquid or flowable materials.

In the past, various methods have been used to determine the level of a liquid in a container from which it is being dispensed.

In the general liquid field, the most common method is by the use of a gloat arm which visual or other level information output is obtained. This method is not used for molten steel and the most common method used is to weigh by means of load cells the ladle from which steel is being teemed and endeavour to determine the contents of the ladle from this information. However, since the quantity of slag in the ladle is largely unknown, this method does not provide an accurate measure of the steel weight. It is expected that this would suffer from a lack of reproducibility of endpoint predictions based on load cell weights so that its usefulness is limited. Lack of accurate knowledge of the level (and thus the weight) of steel in a ladle results in the pouring of unrollable ingot butts.

The problem of ingot butt losses has been without solution for many years and as indicated in "Open Hearth Proceedings", Vol 56 at pages 329 to 335, in which teeming crane weighing is mentioned, the problem was regarded by some as unsolvable. The article referred to proposes the elimination of the problem by not creating such butts on the basis that such residual steel is classed as scrap. However, since many steel works do not regard such residual steel as scrap, a viable method of determining the level of molten metal in a ladle is desirable.

The object of this invention is to provide an alternative method of determining the level of a liquid in a container, which method, in its specific application to steel in a ladle overcomes the disadvantage of the prior art method.

The invention provides a method of determining the level in a container of a liquid having measurable electrical properties, said liquid having another material of different electrical properties on its surface, comprising monitoring an electrical property of said liquid at a level within the container, and detecting the interface between the liquid and other material at said level to thereby determine when the liquid surface is at said level.

In one form of the invention, the electric potential at a level in the container is monitored by means of an electrode capable of sensing the difference in electric potential of the liquid and the other material and a measuring instrument connected in circuit with said electrode and a reference potential.

Alternatively, the conductivity of the liquid is monitored, the level being detected by a change in current flow due to the different electrical properties of the other material. However, for the measurement of molten steel in a ladle the above potential monitoring method is preferred.

The invention also provides an apparatus for determining the level in a container of a liquid having measurable electrical properties, said liquid having another material of different electrical properties on its surface, comprising means for monitoring an electrical property of said liquid at a level within the container, and means for detecting the interface between the two liquids at said level to thereby determine when the liquid surface is at said level.

Preferably said monitoring means comprises an electrode located at said level in the container, circuit means between the electrode and a measuring instrument, said measuring instrument indicating the change in voltage in said circuit when the interface contacts said electrode.

The invention furthermore provides a method of pouring molten steel from a ladle comprising detecting the interface between the molten steel and the slag at a predetermined level within the ladle and calculating the mass of steel then remaining in the ladle, and thereafter modifying the pouring procedure to ensure that only rollable ingot butts are poured.

One preferred form of the invention as applied to the determination of the amount of molten steel in a ladle will now be described with reference to the accompanying drawings in which.

Figure 1:
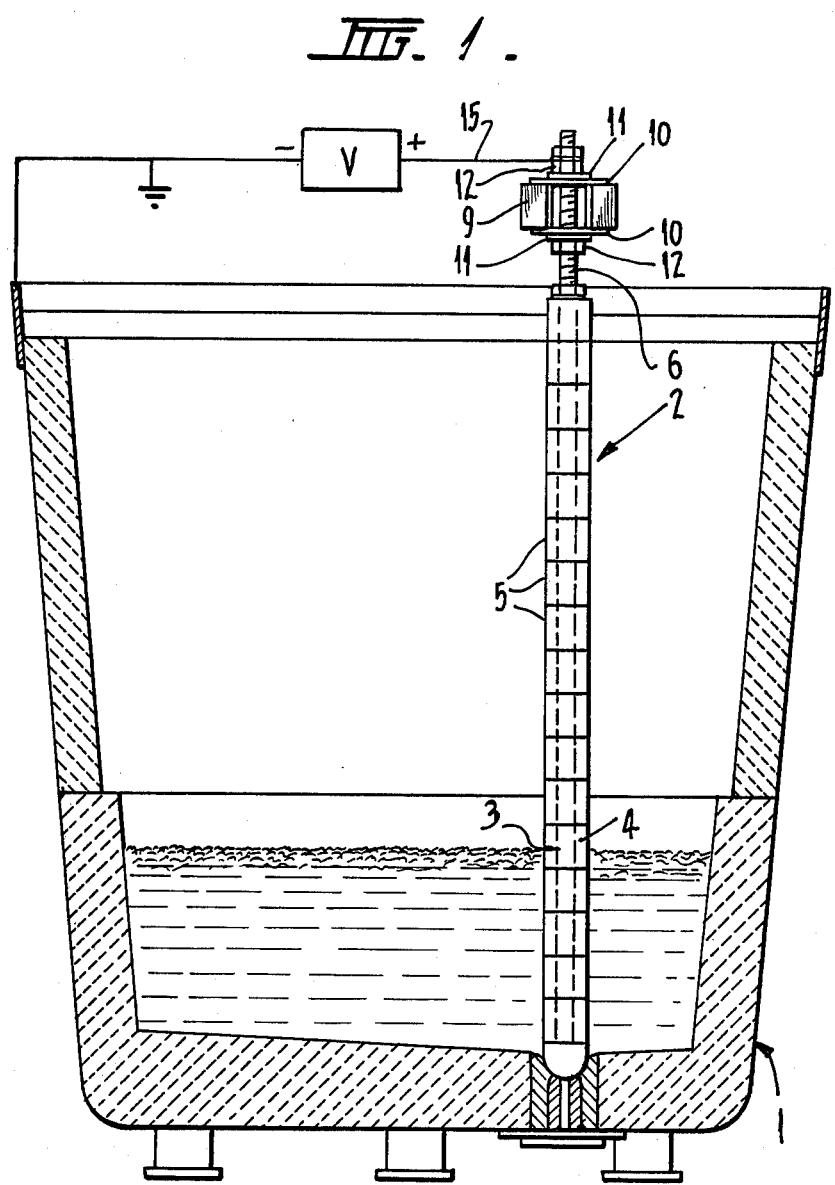
FIG. 1 is a sectional elevation of a ladle having the electrode of the monitoring means in the stopper rod therefor.

Referring now to the drawings, FIG. 1 shows a teeming ladle 1 having a stopper rod 2 modified in accordance with one embodiment of the invention to include an 8 mm diameter low carbon steel electrode 3 held in a hole in a specially prepared refractory sleeve 4 (FIG. 2) on the stopper rod 2 by means of high temperature cement. This sleeve 4 then forms one of the 16 standard sleeves 5 on the stopper rod, the special sleeve 4 being located at a predetermined distance from the bottom of the rod 2 as discussed below. The electrode 3 is electrically connected to the steel core 6 of the rod 2 by means of a conductive wire 8 crimped in slits in the end of the electrode 3 and connected to the core 6 by means of a nail explosively driven into the core 6.

As is usual, the upper end of the stopper rod 2 is supported by a gooseneck 9 by means of which the rod 2 is lifted and lowered to control the teeming operation. In the present embodiment the stopper rod 2 is insulated from the gooseneck 9 by means of the fibre washers 10 interposed between the fork of the gooseneck 9 and steel washers 11 which act as load distributors for the connecting nuts 12. A fibre sheet 13 is located between the rod 2 and the gooseneck fork. An electrical connecting rod 14 is suitably clamped to the upper end of the core 6 of the rod 2 and an electric cable 15 secured to a terminal 16 thereon. The cable 15 is in turn connected to one terminal of a multirange voltage recorder V while the other terminal is connected to ground potential, the same potential as the ladle 1.

In arriving at the above preferred arrangement preliminary trials were conducted using a carbon electrode in a series circuit with a battery for driving a current through the molten steel. However, it was found that the carbon was reactive with the steel and this combined with the applied potential failed to produce completely acceptable results although the method may well be capable of application to other conductive liquids. Further experimentation confirmed the existence of a measurable e.m.f. at a passive electrode, such as low carbon steel, due to the electrochemical potential difference between the steel and slag phases.

Figure 4:
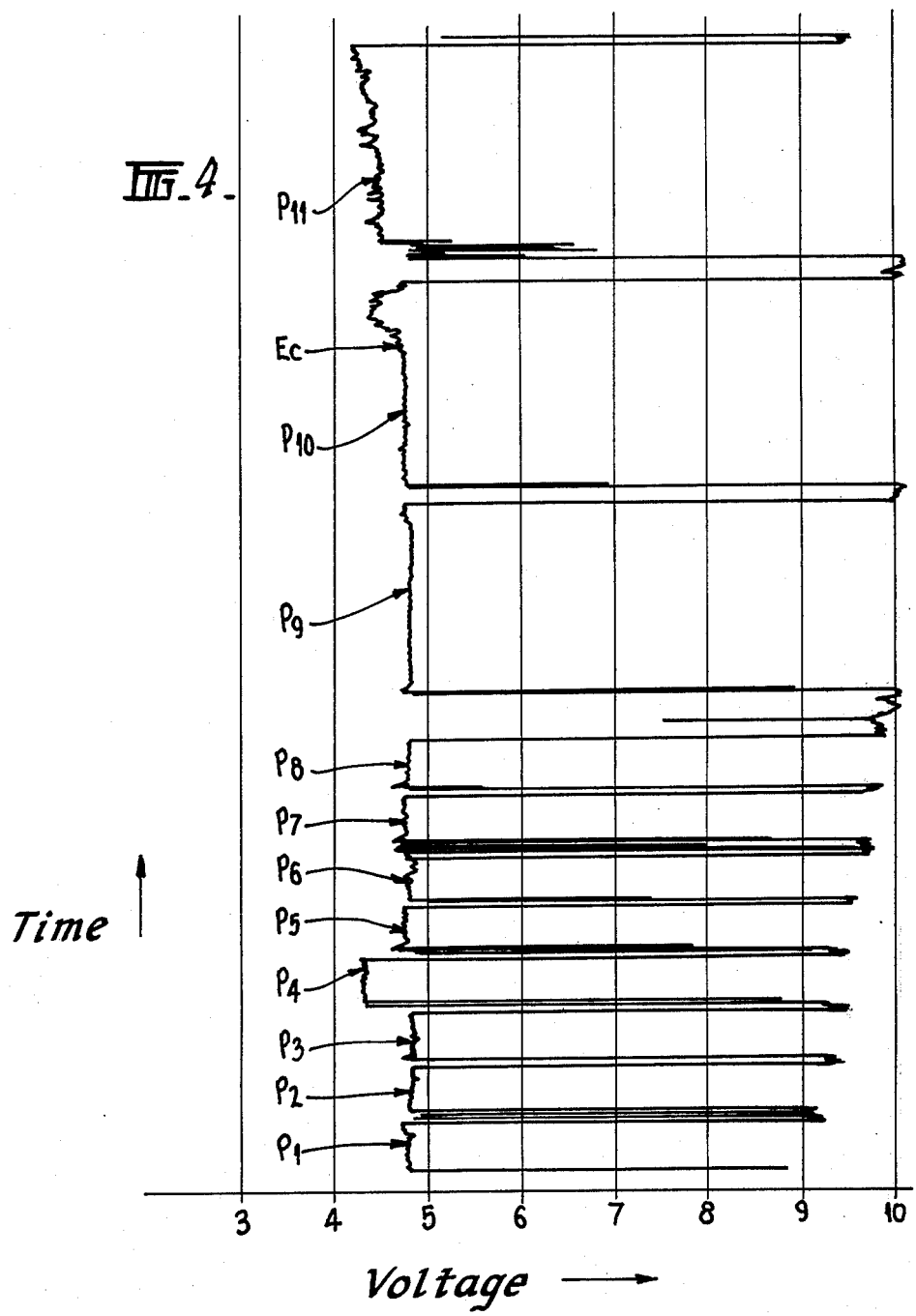
FIG. 4 is a typical voltage waveform showing the point at which the steel-slag interface contacts the electrode.

When the steel electrode 3 is surrounded by molten steel, the equilibrium constant K is close to unity. As the electromotive force $E°$ is proportional to $lnK, E°$ is very small. Therefore, during the teeming of any ingot before the control ingot, the voltage measured at the electrode is close to zero as shown in FIG. 4. The small variations of this measured voltage from heat to heat are largely the result of the variations in oxygen concentration, which determines the extent of the Fe/FeO reaction. When the steel stream is shut off by lowering the stopper rod, the recorder indicates a different voltage level. The recorder trace (FIG. 4) appears as a series of voltage plateaux, each plateau $P_1$ $P_2$ etc. representing the teeming of one ingot.

Experiments have been conducted using the preferred arrangement described above with the electrode 3 located at about 900 mm from the floor of the ladle 1 with the rod 2 closed and at about 950 mm with the rod 2 elevated. In a 200 tonne ladle this means that at the control point referred to above there will be about 51.7 tonnes remaining in a new ladle. For the same ladle at "chop out" the expected mass of steel at control point will be about 58.8 tonnes. The most favourable position for the electrode was found to be when from 40 to 60 tonnes remain in the ladle 1.

Figure 5:
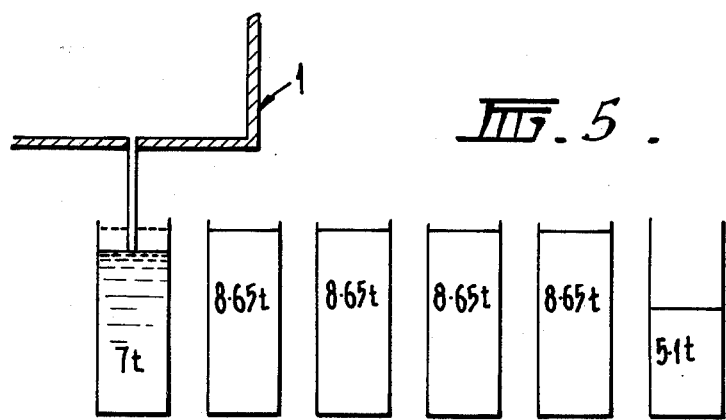
FIG. 5 is a graphical representation of a typical pour.
Figure 6:
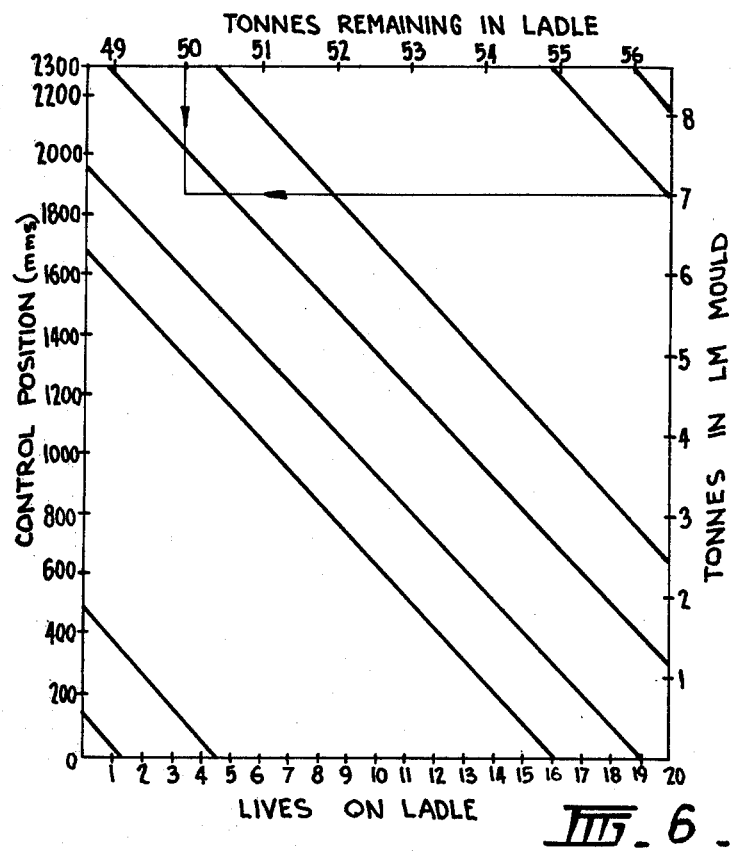
FIG. 6 is a graph illustrating a possible pourdown procedure to avoid the pouring of unrollable butts.

FIGS. 5 and 6 show graphically a typical pourdown procedure for a minimum rollable butt weight of 6 tonnes and a desirable weight of 7 tonnes. Assuming that at the control point calculations indicate that 50 tonnes of steel remain in the ladle and 7 tonnes of steel is in the control mould, if normal teeming practice of pouring 8.65 t ingots is continued at 5.1 t unrollable butt would be poured. FIG. 6 shows a possible pourdown procedure for L.M. ingots. A knowledge of the control point and the number of ladle lives defines a position on the graph, which indicates the procedure to be followed, to ensure that the butt will be of rollable height. For the above example, FIG. 6 indicates that two seven tonne ingots should be poured to ensure that the butt will be of rollable weight (anticipating 8.4 tonnes). If this procedure had not been followed, a non-rollable butt of 5.1 tonnes would have been poured.

Current losses due to the pouring of unrollable butts in the above 200 t Steelmaking System amounts to about 0.80% of the yield. Using the method described above, the procedure shown in FIG. 6 would be used on average 47 times in every 100 heats; i.e. an average of 0.94 seven tonne ingots would be poured every heat. For positive and negative errors not exceeding 1.3 tonnes in estimating the endpoint of the teem, the pourdown procedure outlined could reduce the loss of yield from unrollable butts by 0.71%. Greater savings would be achieved by using the method with the pouring of larger ingots.

Figures 2, 8:
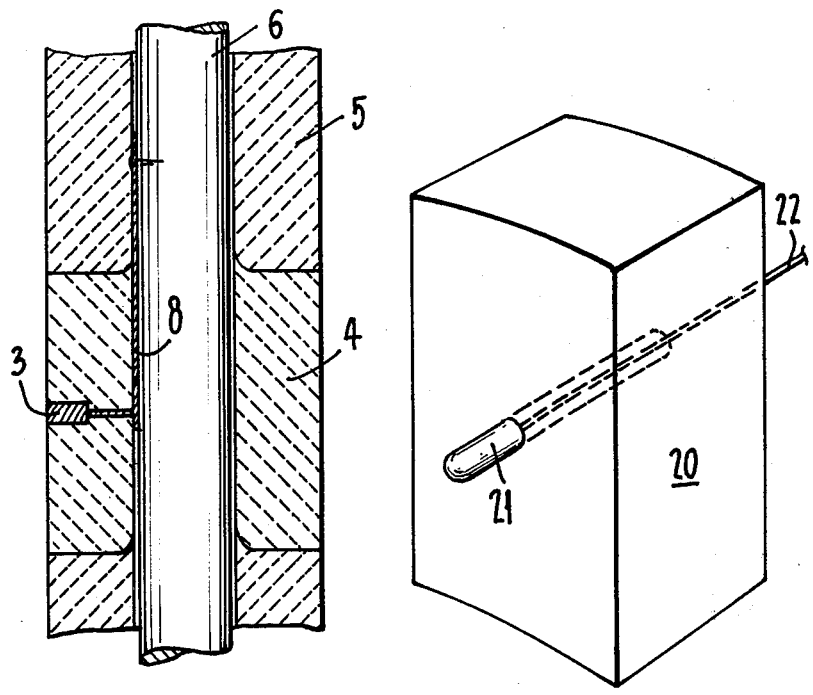
FIG. 2 is an enlarged fragmentary schematic cross-section of the stopper sleeve incorporating the electrode.
FIG. 8 is an enlarged schematic view of the electrode bearing ladle brick used in FIG. 4.
Figure 7:
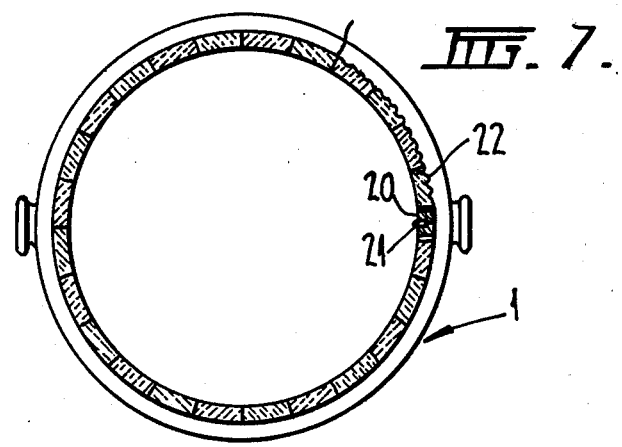
FIG. 7 is a plan view of a ladle showing an alternative electrode arrangement.
Figure 3:
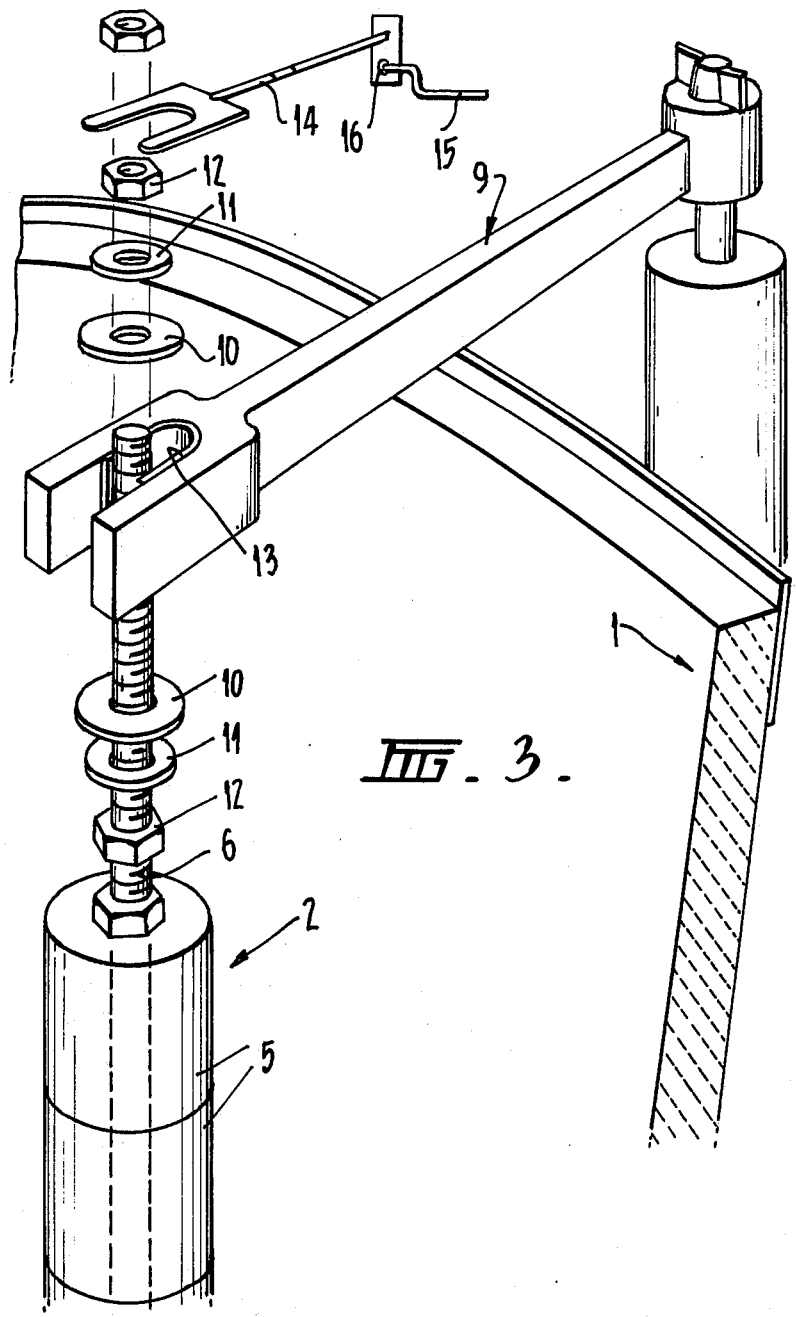
FIG. 3 is an exploded fragmentary view showing the connections to the stopper rod.

An alternative electrode placement is shown in FIGS. 7 and 8. In this arrangement, one of the ladle bricks 20 is replced by a special brick having a steel, carbon or molybdenum electrode 21 secured therein in a manner similar to the preferred embodiment. The special brick 20 is preferably located at the centreline of the ladle trunnions to reduce errors caused by tilting of the ladle. The electrode has a lead wire 22 suitably attached thereto and extends between the bricks and the safety lining to a terminal on the lining. A further lead wire is then connected from the terminal to a voltage recorder as before.

It has been found that his alternative electrode placement achieves better results than the first form described above. At this time the reason for this has not been fully determined but it may be that the placement of the electrode in this manner will be preferred. The mode of operation of this form of the invention is substantially identical to that of the first form.

In other modifications, the lead wire from the stopper rod or electrode to the recorder may be replaced by a transmitter/receiver system. The insulation of the gooseneck as described may be replaced by completely insulating the entire stopper rig from the ladle.

The system described above may also be modified to sense both the metal/slag and slag/air interfaces to thereby enable the mass of the slag to be estimated. In this respect it will be understood that the word "liquid" is introduced to embrace both molten metals and slags as well as other liquids.

In a further modification, the electrode may be replaced by a device for passing lines magnetic flux through the steel at a desired height in the ladle. The device may be inside or outside the ladle provided the flux line can pass through a significant part of the steel and slag at said height. The change in flux density experienced at the steel-slag interface is then detected to indicate when the desired level is reached.

We claim:

1. An apparatus for determing the interface between molten metal and slag in a container comprising a container, an electrode at a predetermined position within said container and in electrical contact with the material therein and measuring the indicating means for measuring at least a first range of voltages produced at said electrode by an electrochemical reaction between said molten metal and said electrode and thereafter measuring at least a second range of voltage produced at said electrode by an electrochemical reaction between said slag and said electrode within said container so that during teeming as the level of molten metal is lowered, said measuring and indicating means will indicate when the measured voltage changes from said first range of voltages to said second range of voltages.

2. Apparatus as in claim 1 wherein said container includes an outlet and a stopper rod for controlling flow of liquid from said outlet wherein said container is a ladle for molten metal.

3. Apparatus as in claim 2 wherein said electrode is mounted on said stopper rod.

4. Apparatus as in claim 3 wherein said electrode is located within a refractory sleeve on said stopper rod.

5. Apparatus as in claim 2 wherein said container has an inner wall comprised of refractory bricks and wherein said electrode is mounted on said refractory brick wall.

6. Apparatus as in claim 5 wherein said electrode is mounted within one of said refractory bricks said electrode projects into the interior of said container.

7. Apparatus as in claim 1 wherein said reference potential is a ground potential.

8. A method of locating the interface between the molten metal and slag phases of a melt held in a container when the melt is being emptied from the container comprising the steps of placing an electrode at a predetermined position within said container, detecting a first voltage potential produced at the electrode by an electrochemical reaction between the molten metal phase of the melt and the electrode and thereafter determining the interface between the molten metal phase and the slag phase of the melt by detecting a second voltage potential produced at the electrode by the electrochemical reaction between the slag phase of the melt and the electrode when the slag phase comes into contact with the electrode.

9. A method as in claim 8 wherein the steps of detecting voltage potential includes the step of maintaining the container at said reference potential.

10. An apparatus for detecting during teeming the location of the interface between molten metal having a first electrical property and a slag layer on the surface of the molten metal having a second electrical property comprising a container for holding the molten metal and slag material, a single electrode located at a predetermined level within said container and contactable by material within said container at said predetermined level, indicating means electrically connected to said single electrode and the material in contact with said single electrode and the molten metal being teemed for indicating the electrical property of the material in contact with said single electrode at said predetermined level so that said indicating means will indicate when the material in contact with said single electrode at said predetermined level changes from a material exhibiting said first electrical property to a material exhibiting said second electrical property 11. A method of locating the interface between molten metal having a first electrical property and a slag layer having a second electrical property which are separate phases of a melt held in a ladle said method being employed when the melt is being emptied from the ladle and comprising the steps of positioning a single electrode at a predetermined level within the ladle and in contact with the material in the ladle at that predetermined level, by employing the molten metal being teemed detecting the first electrical property associated with said molten metal through said electrode positioned at the predetermined level while said electrode is in contact with the molten metal phase of the melt, monitoring the detected first electrical property while teeming and thereafter by employing the molten metal being dispensed determining when the slag phase is at the predetermined level by detecting the second electrical property associated with said slag through said electrode positioned at the predetermined level when the slag phase of the melt contacts said electrode.

* * * * *

UNITED STATES PATENT OFFICE
CERTIFICATE OF CORRECTION

Patent No. 4,037,761              Dated July 26, 1977

Inventor(s) Kenneth Garry Kemlo & Clive Allen Gregory

It is certified that error appears in the above-identified patent and that said Letters Patent are hereby corrected as shown below:

Abstract, Line 4, change "deeming" to -- teeming --;

Column 1, Line 17, change "gloat" to -- float --;

Column 4, Line 16, change "his" to -- this --;

Line 35, after "lines" insert -- of --;

Line 44, change "determing" to -- determining --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks